United States Patent
Takami

(10) Patent No.: US 11,170,520 B2
(45) Date of Patent: Nov. 9, 2021

(54) IMAGE PROCESSING APPARATUS FOR ANALYZING AN IMAGE TO DETECT AN OBJECT WITHIN THE IMAGE

(71) Applicant: CANON KABUSHIKI KAISHA, Tokyo (JP)

(72) Inventor: Shinjiro Takami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 16/425,262

(22) Filed: May 29, 2019

(65) Prior Publication Data

US 2019/0370992 A1   Dec. 5, 2019

(30) Foreign Application Priority Data

May 31, 2018 (JP) .............................. JP2018-104906

(51) Int. Cl.
*G06T 7/70* (2017.01)
*G06F 16/583* (2019.01)
*G06K 9/00* (2006.01)

(52) U.S. Cl.
CPC .............. *G06T 7/70* (2017.01); *G06F 16/583* (2019.01); *G06K 9/00456* (2013.01)

(58) Field of Classification Search
CPC ..... G06F 16/583; G06K 9/00456; G06T 7/70; H04N 21/23412; H04N 21/23418; H04N 21/44008
See application file for complete search history.

(56) References Cited

U.S. PATENT DOCUMENTS

| | | | | |
|---|---|---|---|---|
| 2013/0201338 A1* | 8/2013 | Westmacott | ........... | H04N 7/188 |
| | | | | 348/159 |
| 2015/0312498 A1* | 10/2015 | Kawano | ............. | G06K 9/00711 |
| | | | | 348/222.1 |
| 2018/0129885 A1 | 5/2018 | Potter et al. | | |

FOREIGN PATENT DOCUMENTS

| | | |
|---|---|---|
| CN | 101500084 A | 8/2009 |
| EP | 2940988 A1 | 11/2015 |
| JP | 5999395 B1 | 9/2016 |
| WO | 2015/151095 A1 | 10/2015 |

OTHER PUBLICATIONS

Blog; I Can See Clearly Now: Fisheye Cameras and Dewarping; Aug. 11, 2014, 2 pages, accessed Jan. 14, 2019, http://blog.tycosp.com/index.php/2014/08/11/i-can-see-clearly-now-fisheye-cameras-and-dewarping/.

(Continued)

*Primary Examiner* — Menatoallah Youssef
(74) *Attorney, Agent, or Firm* — Canon U.S.A.. Inc. IP Division

(57) ABSTRACT

An image processing apparatus captures an image, detects an object in the captured image, and transmits the image and metadata containing object information regarding the object detected from the image to an information processing apparatus. If a detection function is valid with respect to a first image to transmit and the detection function is invalid with respect to a second image to transmit after the first image, the image processing apparatus transmits invalidity information indicating that the object is not detected with respect to the second image to the information processing apparatus.

9 Claims, 13 Drawing Sheets

(56) References Cited

OTHER PUBLICATIONS

Jiwon Choi, et al, Object-aware Image Thumbnailing Using Image Classification and Enhanced Detection of ROI, Multimed Tools Appl, Sep. 11, 2015, pp. 16191-16207, vol. 75, Springer Science+Business Media, New York.

Shubham Jain, et al., Panoptes: Servicing Multiple Applications Simultaneously Using Steerable Cameras, Proceedings of the 16th ACM/IEEE International Conference on Information Processing in Sensor Networks, Apr. 2017, pp. 119-130, Pittsburgh, US.

Compact Descriptors for Video Search: Objectives, Applications and Use Cases, Coding of Moving Pictures and Audio, pp. 1-12, draft, ISO/IEC JTC1/SC29/WG11/14094 Oct. 2013, Geneva, CH.

Thomas Deselaers, et al., Pan, Zoom, Scan—Time-coherent, Trained Automatic Video Cropping, Computer Vision and Pattern Recognition (CVPR 2008), pp. 1-8.

\* cited by examiner

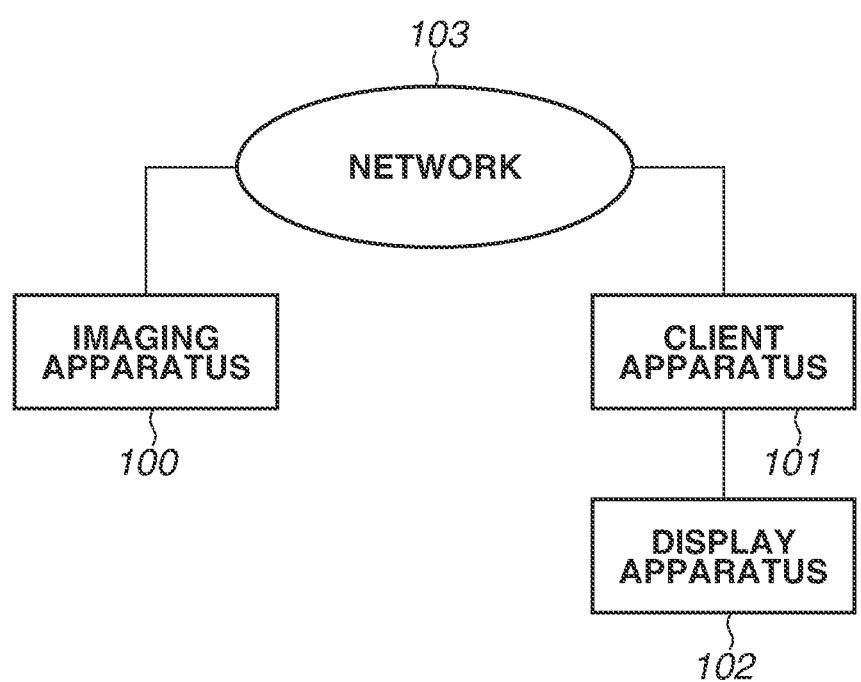

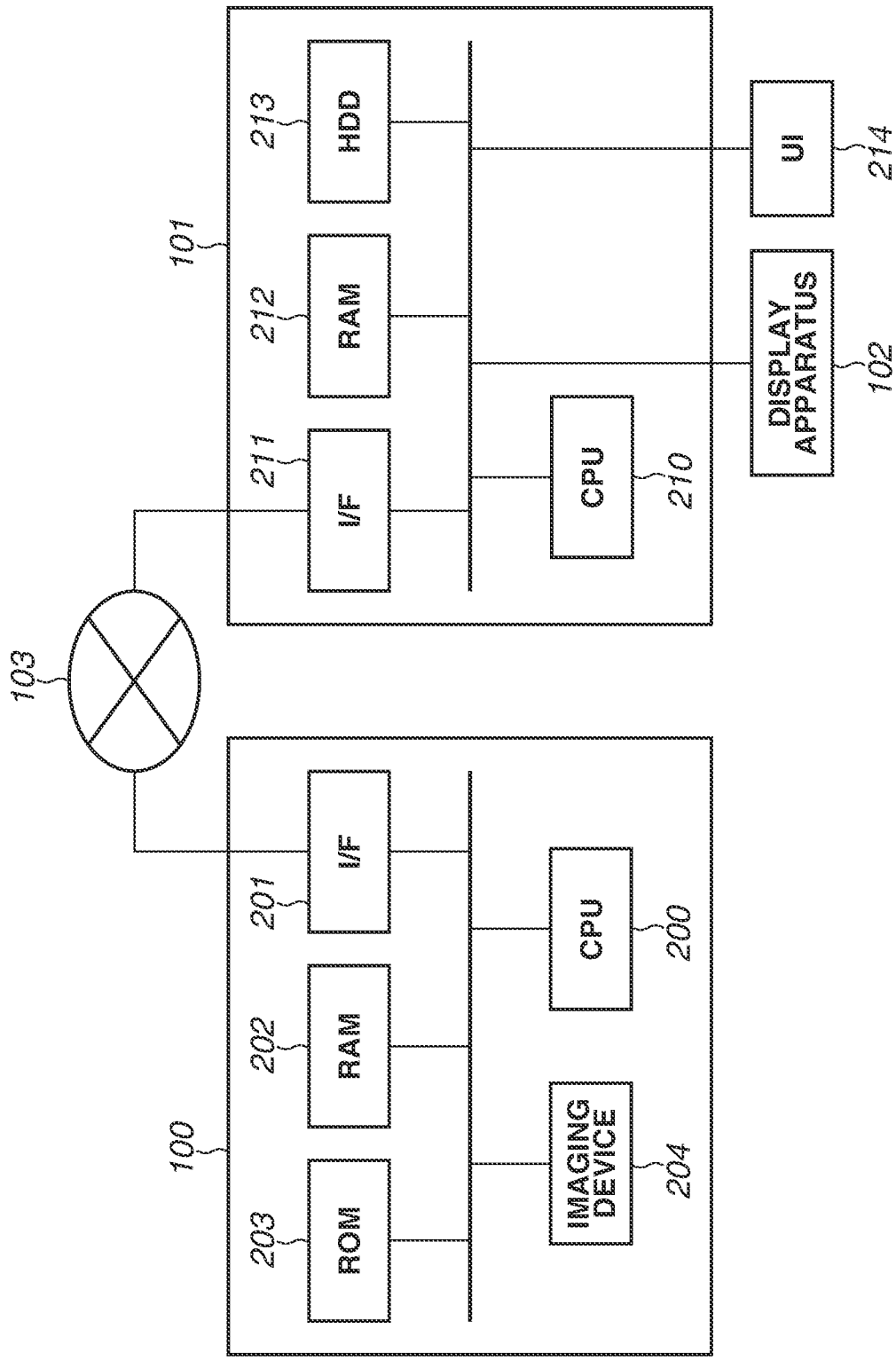

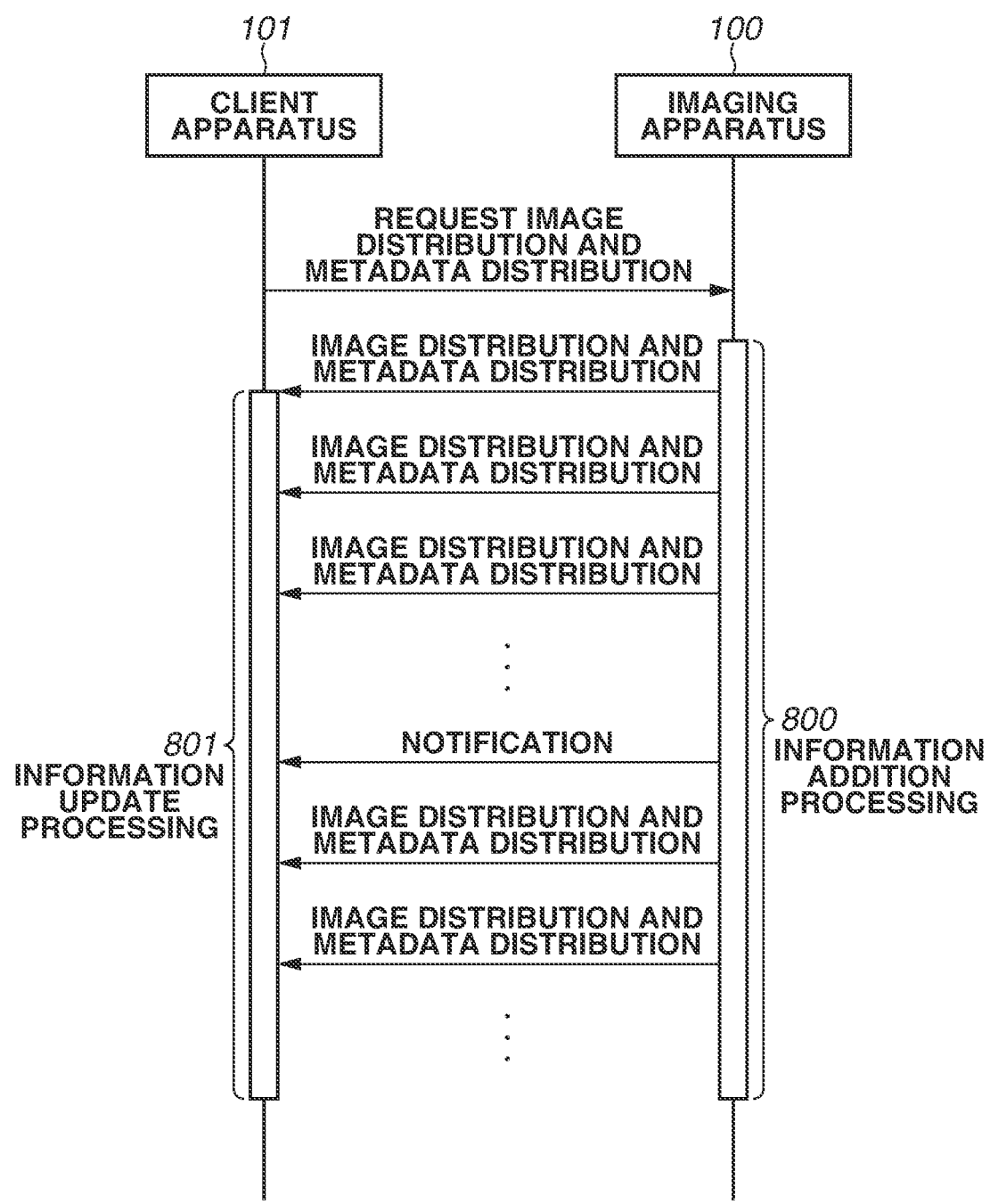

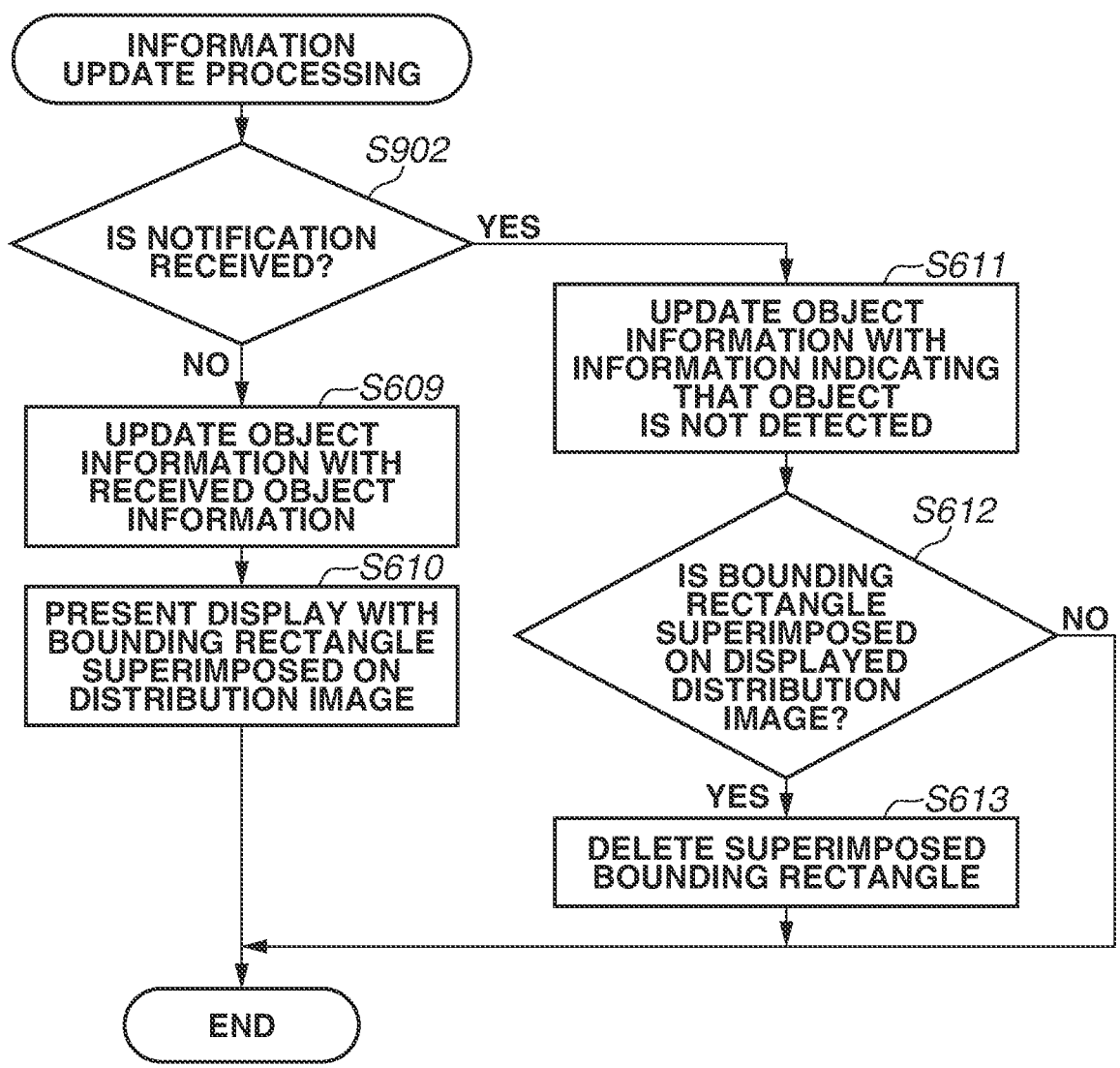

IMAGE PROCESSING APPARATUS FOR ANALYZING AN IMAGE TO DETECT AN OBJECT WITHIN THE IMAGE

BACKGROUND OF THE INVENTION

Field of the Invention

The present invention relates to a technique that analyzes a captured image to detect an object.

Description of the Related Art

Conventionally, there has been an imaging apparatus configured to conduct a video analysis on an image captured by the imaging apparatus and distribute information about an object detected as a result of the video analysis as metadata.

Further, generally, a command group for allowing a client apparatus to instruct the imaging apparatus to change a setting and to start the distribution of the image and the metadata is implemented on the imaging apparatus configured to distribute the captured image to the client apparatus. For example, there has been known a command group defined by a standard formulated by Open Network Video Interface Forum (ONVIF) as an example of such a command group. ONVIF also defines a content of the metadata, and examples of this content of the metadata include object information containing details of the object detected by the video analysis. Examples of the object information include positional information indicating a position of the object detected in the image.

Further, Japanese Patent No. 5999395 discloses an imaging apparatus that determines whether to distribute or not metadata based on a video type of a distributed video image.

Then, in a case where the imaging apparatus uses a protocol that adds the object information to the metadata only when there is a change in the object information about the detected object, the client apparatus that receives the metadata may continue holding the object information received last time. At this time, when the detection function becomes invalid with respect to the image that the imaging apparatus transmits, the client apparatus may continue holding the object information received last time and determine that the object is continuously detected. In this case, the object information that the client apparatus continues holding is invalid information after the detection function of the imaging apparatus becomes invalid.

According to the technique discussed in Japanese Patent No. 5999395, even when the detection function becomes invalid on the imaging apparatus side, the client apparatus may incorrectly determine that the object is continuously detected on the imaging apparatus side and undesirably present a display misleading a user.

SUMMARY OF THE INVENTION

To prevent the client apparatus from continuing holding the invalid object information, according to an aspect of the present invention, an imaging apparatus includes an image acquisition unit configured to capture an image, a detection unit configured to detect an object in the image captured by the image acquisition unit, and a transmission unit configured to transmit the image and metadata containing object information regarding the object detected from the image by the detection unit to an information processing apparatus. If a detection function of the detection unit is valid with respect to a first image that the transmission unit transmits and the detection function is invalid with respect to a second image that the transmission unit transmits after the first image, the transmission unit transmits invalidity information indicating that the object is not detected with respect to the second image to the information processing apparatus.

Further features of the present invention will become apparent from the following description of embodiments with reference to the attached drawings.

BRIEF DESCRIPTION OF THE DRAWINGS

FIG. 1 is a schematic view illustrating a system configuration.

FIG. 2 illustrates outlines of hardware configurations of an imaging apparatus and a client apparatus.

FIG. 8 is a sequence diagram regarding the image distribution and the metadata distribution between the imaging apparatus and the client apparatus.

FIGS. 9A and 9B are flowcharts of information addition processing and information update processing, respectively.

DESCRIPTION OF THE EMBODIMENTS

Figure 3A:
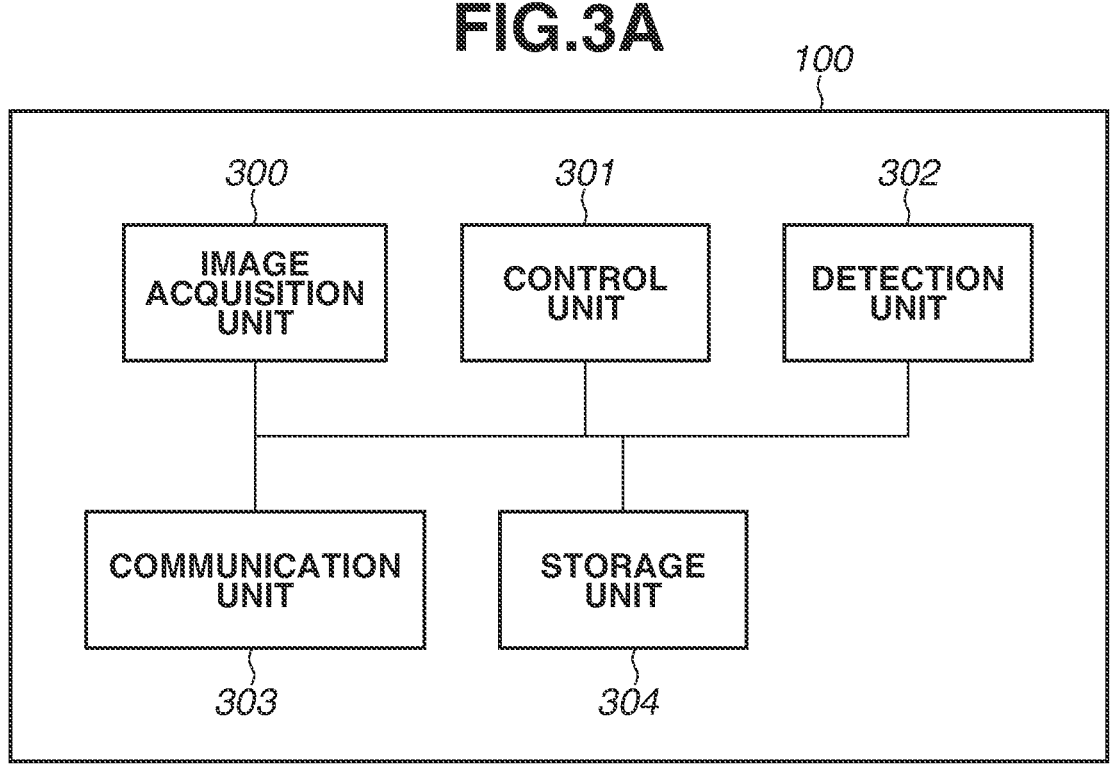
FIGS. 3A and 3B are functional block diagrams of the imaging apparatus and the client apparatus, respectively.

In the following description, embodiments of the present invention will be described with reference to the accompanying drawings. Configurations that will be described in the following embodiments are merely one example, and the present invention shall not be limited to the illustrated configurations.

In the following description, a first embodiment will be described. FIG. 1 is a schematic view illustrating a system configuration according to the present embodiment. An imaging apparatus 100 is an apparatus that captures an image, and is, for example, a network camera or a monitoring camera capable of transmitting the image via a network 103.

A client apparatus 101 is an information processing apparatus, and is communicably connected to the imaging apparatus 100 via the network 103. The client apparatus 101 transmits, to the imaging apparatus 100, each control command, such as a command requesting image distribution and metadata distribution and a command for acquiring a type of an image on which an image analysis is conducted. The imaging apparatus 100 transmits, to the client apparatus 101, a response to the command transmitted from the client apparatus 101, an image in response to the image distribution request, and metadata in response to the metadata distribution request.

A display apparatus 102 is connected to the client apparatus 101, and is, for example, a display that displays, for example, an image based on the image data transmitted from the imaging apparatus 100.

Further, the imaging apparatus 100 and the client apparatus 101 communicate with each other via the network 103. The network 103 includes a plurality of routers, a plurality of switches, and/or a plurality of cables that satisfy a communication standard such as ETHERNET (registered trademark). The network 103 may be constructed with use of the Internet, a wired local area network (LAN), a wireless LAN, a wide area network (WAN), or the like.

Next, hardware configurations of the imaging apparatus 100 and the client apparatus 101 will be described with reference to FIG. 2. FIG. 2 illustrates outlines of the hardware configurations of the imaging apparatus 100 and the client apparatus 101.

First, the hardware configuration of the imaging apparatus 100 will be described. A central processing unit (CPU) 200 comprehensively controls the imaging apparatus 100.

An interface (I/F) 201 is in charge of the communication with the client apparatus 101 according to a protocol such as Open Network Video Interface Forum (ONVIF) via the network 103. The I/F 201, for example, transmits the image and the metadata to the client apparatus 101, and receives, for example, various kinds of commands for controlling the imaging apparatus 100 from the client apparatus 101.

A random access memory (RAM) 202 temporarily stores therein a computer program that the CPU 200 executes. Further, the RAM 202 temporarily stores therein data acquired from outside via the I/F 201 (for example, the command, and a parameter regarding an imaging condition). Further, the RAM 202 provides a work area used when the CPU 200 performs, for example, flowcharts illustrated in FIGS. 6A and 9A and sequences illustrated in FIGS. 4, 8, and 10, which will be described below. Further, the RAM 202, for example, functions as a frame memory and functions as a buffer memory.

A read only memory (ROM) 203 stores therein, for example, a program used for the CPU 200 to control the imaging apparatus 100. The imaging apparatus 100 may be configured to include a secondary storage device similar to a hard disk drive (HDD) 213, which will be described below, in addition to the ROM 203.

An imaging device 204 includes a lens group and an image sensor that form an imaging optical system. The lens group includes an optical lens for forming an image from incident light and collects the incident light on the image sensor. The image sensor includes a charge coupled device (CCD) sensor, a complementary metal oxide semiconductor (CMOS) sensor, or the like. Then, the imaging device 204 generates an electric signal by photoelectrically converting a subject image that is formed on the image sensor by being transmitted through the lens group of the imaging apparatus 100. Further, the imaging device 204 generates image data by performing processing for converting the generated electric signal into a digital signal and encoding processing based on a format such as Joint Photographic Experts Group (JPEG), H.264, and H.265.

Next, the hardware configuration of the client apparatus 101 will be described. A CPU 210 controls the client apparatus 101.

An I/F 211 is in charge of the communication with the imaging apparatus 100 according to the protocol such as ONVIF via the network 103. Further, the I/F 211, for example, receives the image transmitted from the imaging apparatus 100, and transmits, for example, the various kinds of commands for controlling the imaging apparatus 100.

A RAM 212 temporarily stores therein a computer program that the CPU 210 executes. Further, the RAM 212 temporarily stores therein, for example, data acquired from outside via the I/F 211 (the command and the image data). Further, the RAM 212 provides a work area used when the CPU 210 performs, for example, flowcharts illustrated in FIGS. 6B, 9B, and 11 and the sequences illustrated in FIGS. 4, 8, and 10, which will be described below. Further, the RAM 212, for example, functions as a frame memory and functions as a buffer memory.

The CPU 210 executes a computer program stored in the RAM 212. A processor such as a digital signal processor (DSP) may also be used besides the CPU.

The HDD 213 stores therein a program of an operating system and the image data. The computer program and the data for performing the flowcharts and the sequences that will be described below are stored in the HDD 213 loaded into the RAM 212 as necessary according to the control by the CPU 210 and executed by the CPU 210. Other storage media, such as a flash memory, may also be used besides the HDD.

A casing of the client apparatus 101 may be prepared integrally with the display apparatus 102. A user interface (UI) 214 is an input device, such as a keyboard and a mouse.

In the following description, the present embodiment will be described referring to an example in which the CPU 210 performs the flowcharts and the sequences that will be described below, but may be configured in such a manner that at least a part of the processing of the CPU 210 is performed by dedicated hardware. For example, processing for displaying a graphical user interface (GUI) and the image data on the display apparatus 102 may be performed by a graphics processing unit (GPU). Further, processing for reading out a program code from the HDD 213 to develop it into the RAM 212 may be performed by a direct memory access (DMA) functioning as a transfer device.

Next, the imaging apparatus 100 according to the present embodiment will be described with reference to FIG. 3A. FIG. 3A is a diagram illustrating a functional block of the imaging apparatus 100. In FIG. 3A, the imaging apparatus 100 includes an image acquisition unit 300, a control unit 301, a detection unit 302, a communication unit 303, and a storage unit 304. In the following description, each of the functional blocks included in the imaging apparatus 100 illustrated in FIG. 3A is realized by the CPU 200 executing the program stored in the ROM 203.

The image acquisition unit 300 acquires the image data generated by the imaging device 204.

The control unit 301 controls overall processing of the imaging apparatus 100 according to the processing performed by the CPU 200.

The detection unit 302 performs processing for detecting an object in the image acquired by the image acquisition unit 300. Object information about the object detected by the detection unit 302 is transmitted to the communication unit 303 and/or the storage unit 304.

The detection unit 302 according to the present embodiment carries out pattern matching using a collation pattern (a dictionary), and detects a human body in the image. The detection unit 302 may employs another method as long as having a function of detecting a certain object set as a target that a user wants to detect from the image. The processing performed by the detection unit 302 may be known moving object detection, skin color detection, or the like, and is not limited to the pattern matching processing. Further, in the following description, the detection unit 302 according to the present embodiment will be described assuming that the human body is set as the target for the detection, but the target for the detection may be, for example, a human face, a vehicle, or an animal.

The communication unit 303 receives each control command from the client apparatus 101 via the I/F 201. Further, the communication unit 303, for example, transmits the image and the metadata to the client apparatus 101 based on each control command received from the client apparatus 101 and transmits an event notification to the client apparatus 101 via the I/F 201.

Further, the communication unit 303 according to the present embodiment performs the following processing. That is, if the detection function of the detection unit 302 is valid with respect to a first image that the communication unit 303 transmits and the detection function is invalid with respect to a second image that the communication unit 303 transmits after the first image, the communication unit 303 transmits invalidity information indicating that the object is not detected with respect to the second image.

The invalidity information according to the present embodiment is metadata indicating that the object is not detected. Further, the detection function according to the present embodiment means the function of detecting the object by the detection unit 302. Further, in the present embodiment, the detection function is determined to be valid if an image type of a distribution image that the communication unit 303 transmits and an image type of an image on which the detection unit 302 performs the processing for detecting the object match each other, and is determined to be invalid if these image types do not match each other. This is because, even if the detection function is exerted with respect to an image little relevant to the distribution image, a detection result thereof is little worthwhile for the user.

The storage unit 304 stores therein a setting value indicating an installation state of the camera, such as installation on a ceiling and installation on a wall, a setting value of the image type of the distribution image, a setting value of the image type of the image on which the video analysis is conducted, the image data acquired by the image acquisition unit 300, and the like. The image type in the present example refers to a type of the image generated by the imaging device 204, and examples thereof include a fisheye image captured by a fisheye camera and a panoramic image generated by carrying out an image correction and an image cutout on the fisheye image.

Further, in the present embodiment, the video analysis will be described assuming that it is the processing for detecting the object from the image by the detection unit 302.

Figure 3B:
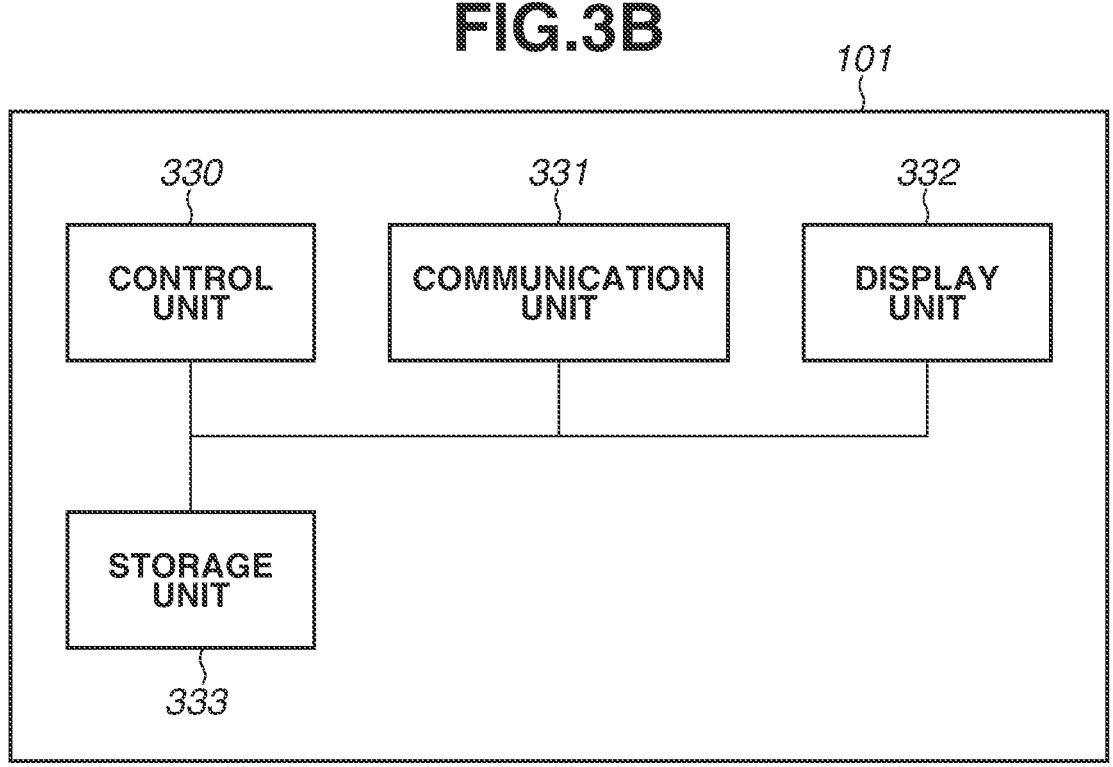

Next, the client apparatus 101 according to the present embodiment will be described with reference to FIG. 3B. FIG. 3B is a functional block diagram of the client apparatus 101. In FIG. 3B, the client apparatus 101 includes a control unit 330, a communication unit 331, a display unit 332, and a storage unit 333. In the following description, each of the functional blocks included in the client apparatus 101 like the examples illustrated in FIG. 3B is executed by the CPU 210.

The control unit 330 controls overall processing of the client apparatus 101 according to the processing performed by the CPU 210.

The communication unit 331 transmits, to the imaging apparatus 100 via the I/F 211, each control command, such as the command requesting the image distribution and the metadata distribution and the command for acquiring the image type of the image on which the video analysis is conducted. Further, the communication unit 331 receives the response to each control command that is transmitted from the imaging apparatus 100, the captured image and the metadata, the event notification, and the like from the imaging apparatus 100 via the I/F 211.

The display unit 332 causes the display apparatus 102 to output thereon the image received via the communication unit 331. Further, the display unit 332 causes the display apparatus 102 to output thereon information based on the object information about the object detected by the detection unit 302 of the imaging apparatus 100. The display unit 332 according to the present embodiment causes the display apparatus 102 to output thereon a bounding rectangle indicating the position of the object in the image while superimposing the bounding rectangle on the received image, based on the object information about the object detected by the detection unit 302.

The storage unit 333 is used as an area storing therein various kinds of data, such as the image data of the image captured by the imaging apparatus 100 and the image type of the image on which the video analysis is conducted by the imaging apparatus 100.

Figure 4:
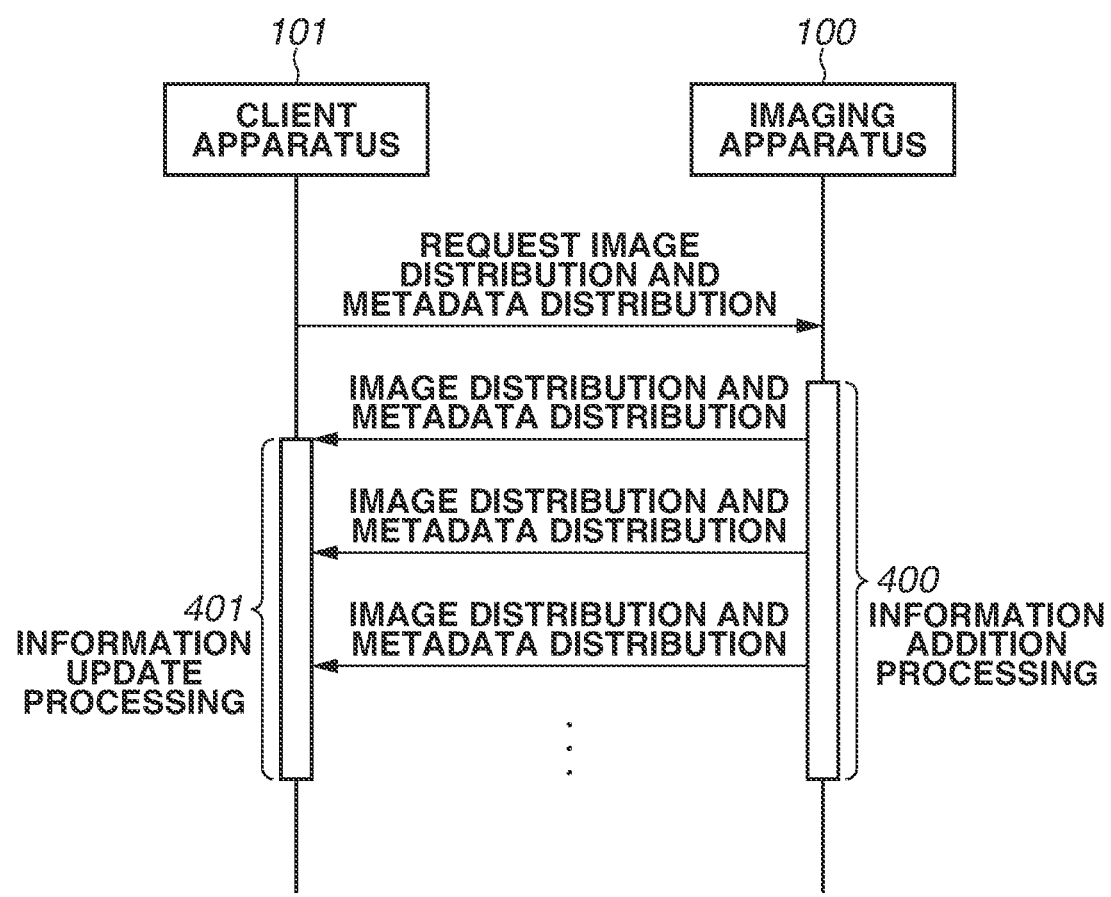
FIG. 4 illustrates a sequence of image distribution and metadata distribution between the imaging apparatus and the client apparatus.

Next, a sequence in which the imaging apparatus 100 provides the image distribution and the metadata distribution to the client apparatus 101 will be described with reference to FIG. 4. FIG. 4 illustrates the sequence in which the image distribution and the metadata distribution are provided from the imaging apparatus 100 to the client apparatus 101 according to the present embodiment.

The control unit 330 of the client apparatus 101 controls the communication unit 331 to cause it to transmit a command requesting the image distribution and the metadata distribution in which the type of the image is specified so as to receive the image distribution and the metadata distribution from the imaging apparatus 100.

The communication unit 303 of the imaging apparatus 100 receives the command requesting the image distribution and the metadata distribution.

The control unit 301 of the imaging apparatus 100 generates the distribution image according to the image type specified by the client apparatus 101 and the metadata by performing information addition processing 400 for adding the object information to the metadata, based on the received command. The information addition processing 400 according to the present embodiment will be described in detail below with reference to FIGS. 6A and 7.

The control unit 301 of the imaging apparatus 100 controls the communication unit 303 to cause it to transmit the generated image and metadata to the client apparatus 101. Then, the communication unit 331 of the client apparatus 101 receives the transmitted image and metadata. If the client apparatus 101 receives metadata containing the object information or metadata indicating that the object is not detected, the client apparatus 101 performs information update processing 401. The information update processing 401 according to the present embodiment will be described in detail below with reference to FIG. 6B.

A protocol of the command for use in the communication between the client apparatus 101 and the imaging apparatus 100 illustrated in FIG. 4 may be ONVIF or may be a control protocol specific to the monitoring camera that is prepared by each manufacturer.

Figure 5:
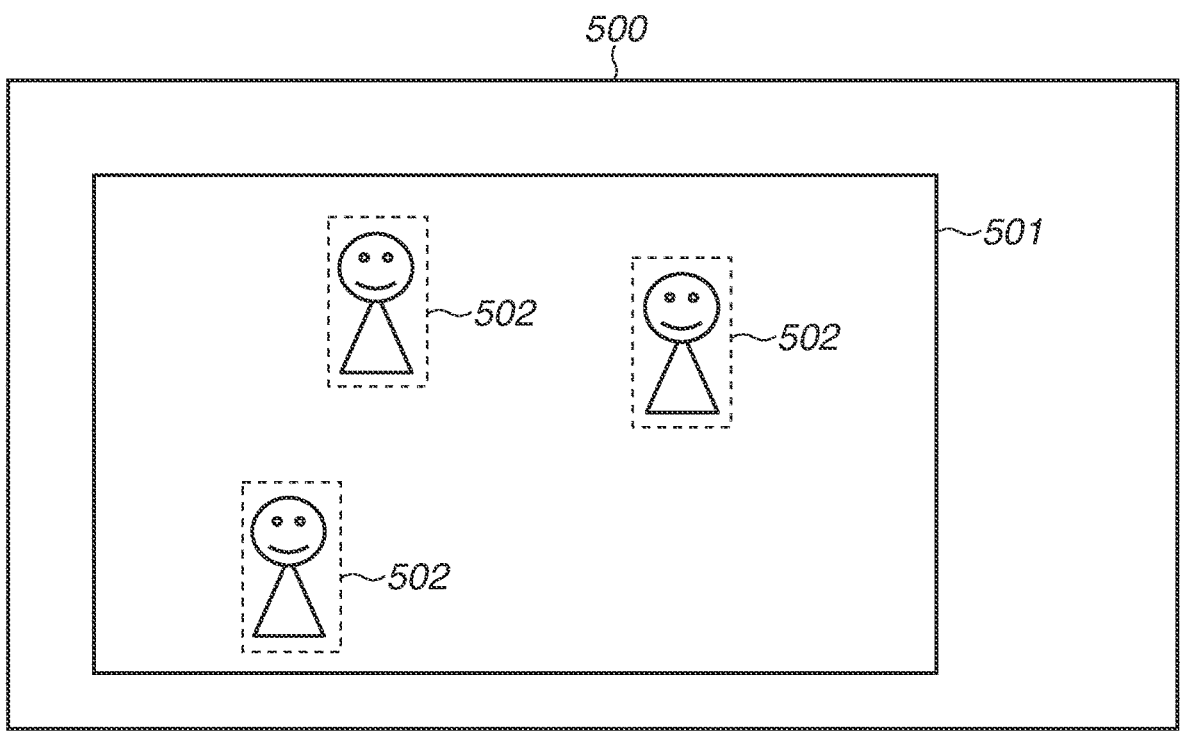
FIG. 5 is a schematic view of a screen displayed on a display apparatus.

Next, processing performed by the display unit 332 of the client apparatus 101 will be described with reference to FIG. 5. FIG. 5 illustrates one example of a viewer screen. A viewer screen 500 in FIG. 5 is displayed on the display apparatus 102 by the display unit 332 of the client apparatus 101. The display unit 332 causes the display apparatus 102 to present a display thereon while superimposing a bounding rectangle 502 of the object information contained in the received metadata on the image 501 received from the imaging apparatus 100.

Figure 6A:
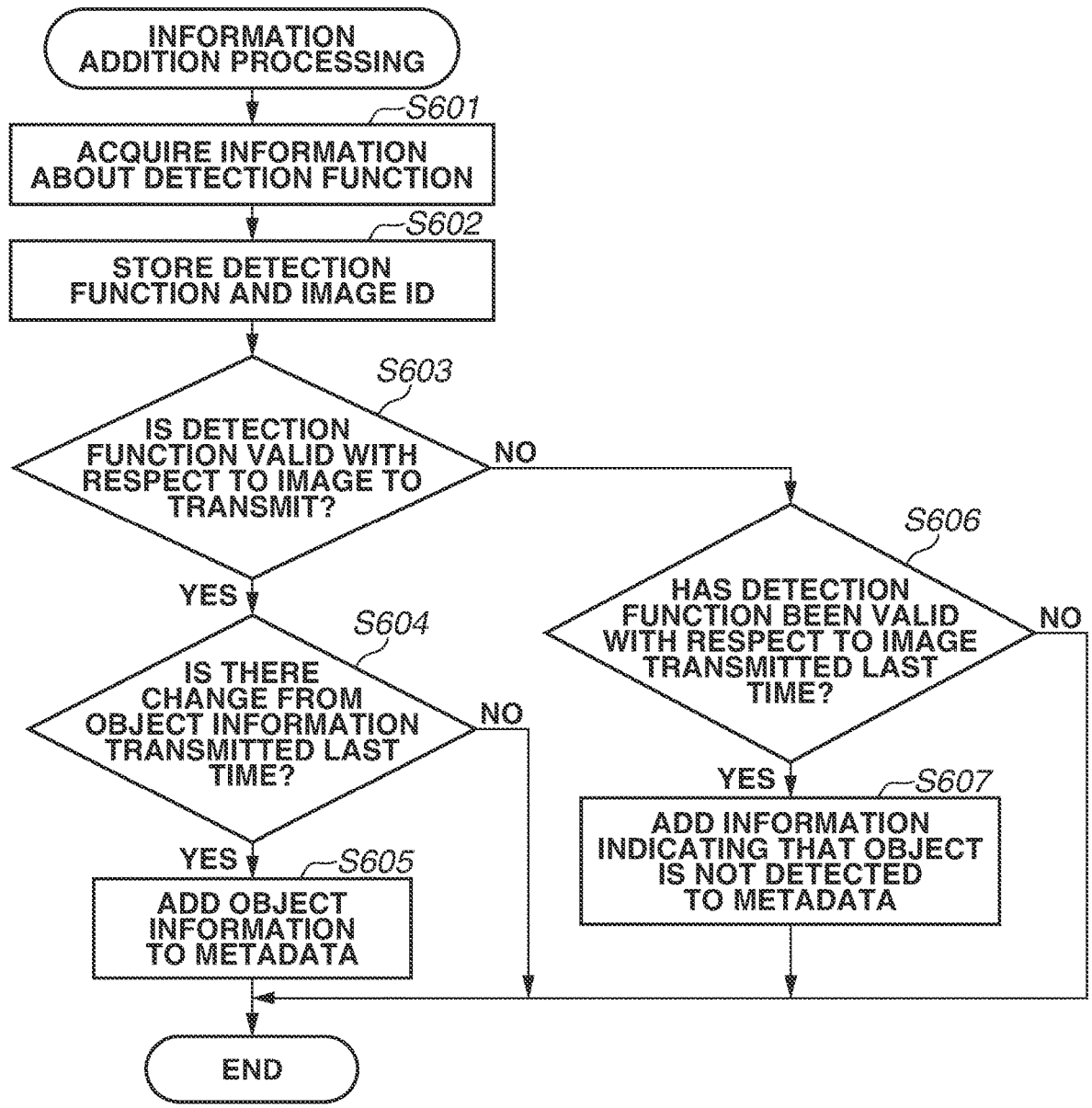
FIGS. 6A and 6B are flowcharts of information addition processing and information update processing, respectively.

Next, the information addition processing 400 according to the present embodiment will be described with reference to FIGS. 6A and 7. FIG. 6A is a flowchart illustrating a flow of the processing for adding the object information or the information about no detection of the object which indicates that the object is not detected to the metadata. The processing according to the flowchart illustrated in FIG. 6A will be described assuming that it is performed by each of the functional blocks illustrated in FIG. 3A that are realized by the CPU 200 executing the computer program stored in the ROM 203 of the imaging apparatus 100.

In step S601, the control unit 301 acquires information indicating whether the detection function of the detection unit 302 is valid or invalid. At this time, the control unit 301 according to the present embodiment determines that the detection function is valid if the image type of the distribution image that the communication unit 303 transmits and the image type of the image on which the detection unit 302 performs the processing for detecting the object match each other, and determines that the detection function is invalid if these image types do not match each other. For example, the control unit 301 determines that the detection function of the detection unit 302 is invalid with respect to the image that the communication unit 303 transmits if the distribution image that the communication unit 303 transmits is the fisheye image and the image on which the detection unit 302 performs the processing for detecting the object is the panoramic image.

To achieve this determination, the control unit 301 according to the present embodiment acquires the image type of the distribution image and the image type of the image on which the video analysis is conducted. At this time, the control unit 301 according to the present embodiment acquires the setting value of the image type of the distribution image and the setting value indicating the installation state of the camera from the storage unit 304. Then, the control unit 301 determines that the image type of the image on which the video analysis is conducted is the fisheye image if the installation state of the imaging apparatus 100 is the installation on a ceiling, and determines that the image type of the image on which the video analysis is conducted is the panoramic image if the installation state of the camera is the installation on a wall. In this manner, the control unit 301 according to the present embodiment acquires the image type of the image on which the video analysis is conducted based on the installation state of the imaging apparatus 100.

The control unit 301 may be configured to acquire the setting value of the image type of the distribution image and the setting value of the image type on which the video analysis is conducted from the storage unit 304 in the case where the setting value of the image type on which the video analysis is conducted is stored in the storage unit 304.

Then, the control unit 301 according to the present embodiment acquires the information about the detection function by determining whether the detection function of the detection unit 302 is valid or invalid with respect to the image that the communication unit 303 transmits based on the acquired image type of the distribution image and image type on which the video analysis is conducted.

In step S602, the storage unit 304 stores an image identification (ID) indicating a transmission order of the image that the communication unit 303 transmits, and the information indicating whether the detection function of the detection unit 302 is valid or invalid that is determined by the control unit 301 with respect to this image, in association with each other. For example, the control unit 301 assigns "1" as the image ID to an image that is transmitted first via the communication unit 303, and assigns "2" as the image ID to an image that is transmitted second. Then, the storage unit 304 stores therein the image ID and the information about the detection function with respect to the image corresponding to the image ID in association with each other.

In step S603, the control unit 301 determines whether the detection function of the detection unit 302 is valid or not with respect to the image that the communication unit 303 transmits. If the detection function is valid (YES in step S603), the processing proceeds to step S604. If the detection function is invalid (NO in step S603), the processing proceeds to step S606.

If there is a change in the object information distributed in the metadata distribution last time in step S604 (YES in step S604), the processing proceeds to step S605. If there is no change in step S604 (NO in step S604), the processing ends.

Next, in step S605, the control unit 301 of the imaging apparatus 100 adds the object information about the object detected by the detection unit 302 to the metadata. Then, the processing ends.

In step S606, the control unit 301 determines whether the detection function of the detection unit 302 has been valid or invalid with respect to the image transmitted last time based on the image ID indicating the transmission order of the image and the information indicating whether the transmission function is valid or invalid with respect to this image that are stored in the storage unit 304. At this time, if the detection function has been valid with respect to the image transmitted by the communication unit 303 last time (YES in step S606), the processing proceeds to step S607. If the detection function has been invalid (NO in step S606), the processing ends. Further, the processing ends in step S604 if there is no image transmitted last time, i.e., the information addition processing 400 is performed for the first time after the request for the image distribution and the metadata distribution is transmitted from the client apparatus 101 to the imaging apparatus 100.

In step S607, the control unit 301 adds the information indicating that the detection unit 302 does not detect the object to the metadata. Then, the processing ends.

The metadata generated by the above-described information addition processing 400 is transmitted to the client apparatus 101.

Figure 6B:
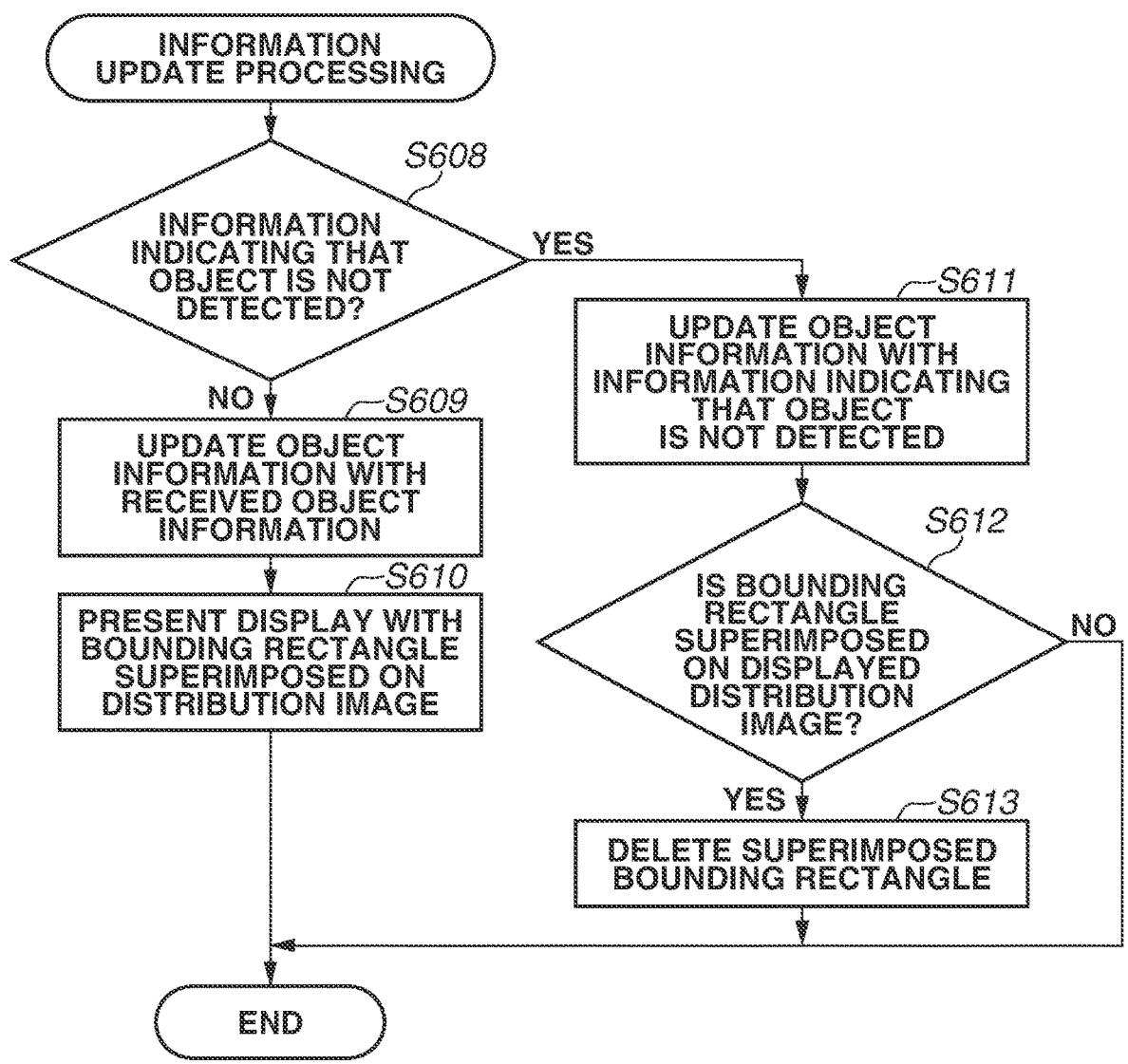

Next, the information update processing 401 performed by the client apparatus 101 illustrated in FIG. 6B will be described. The client apparatus 101 performs the information update processing 401 upon receipt of the metadata containing the object information or the metadata indicating that the object is not detected.

If the metadata does not contain the information indicating that the object is not detected in step S608 (NO in step S608), the processing proceeds to step S609. If the metadata contains the information indicating that the object is not detected in step S608 (YES in step S608), the processing proceeds to step S611.

In step S609, the control unit 330 of the client apparatus 101 updates the object information with the object information contained in the metadata received from the imaging apparatus 100. Then, the processing proceeds to step S610.

In step S610, the display unit 332 displays the object information updated in step S610 on the display apparatus 102 while superimposing it on the distribution image. Then, the processing ends. In the present embodiment, the display unit 332 causes the display apparatus 102 to display thereon the bounding rectangle indicating the position of the detected object while superimposing it on the distribution image based on the updated object information.

In step S611, the control unit 330 of the client apparatus 101 updates the object information with the information indicating that the object is not detected.

If the object information is not superimposed on the distribution image displayed on the display apparatus 102 in step S612 (NO in step S612), the processing ends. If the object information is superimposed on the distribution image in step S612 (YES in step S612), the processing proceeds to step S613.

In step S613, the display unit 332 deletes the bounding rectangle based on the object information that is superimposed on the distribution image displayed on the display apparatus 102.

If the image type of the distribution image and the image type on which the video analysis is conducted do not match each other, the object information may be undesirably superimposed at an invalid position when being superimposed on the distribution image on the client side. For example, suppose that the imaging apparatus 100 according to the present embodiment is capable of capturing the fisheye image with use of the fisheye lens and is further capable of generating the panoramic image by carrying out the distortion correction and the image cutout on the fisheye image.

At this time, if the distribution image is the fisheye image and the video analysis is conducted on the panoramic image, the fisheye image is distributed but the object information about the object detected on the panoramic image is provided as the object information distributed in the metadata distribution. As a result, the object information detected in the panoramic image is superimposed on the fisheye image. This means that the bounding rectangle is superimposed at a position irrelevant to the content of the fisheye image, and therefore the detection function is no longer valid (becomes invalid) with respect to the image transmitted to the client apparatus 101.

Further, besides that, for example, when the distribution image is the fisheye image and the video analysis is conducted on the image cut out from the fisheye image, the bounding rectangle is also superimposed at a position irrelevant to the content of the fisheye image in a similar manner and therefore the detection function becomes invalid with respect to the image transmitted to the client apparatus 101.

To address this inconvenience, the imaging apparatus 100 according to the present embodiment acquires the image type on which the imaging apparatus 100 conducts the video analysis and the image type of the distribution image. Then, if the image type of the distribution image and the video type on which the video analysis is conducted do not match each other, the imaging apparatus 100 handles the image to be transmitted as one for which the detection function of the detection unit 302 is invalid, and adds the information indicating that any object is not detected to the metadata and transmits it to the client apparatus 101. By this operation, the client apparatus 101 can be prevented from holding the invalid object information.

In step S601, the control unit 301 according to the present embodiment acquires the information about the detection function by determining whether the detection function is valid or not with respect to the image that the communication unit 303 transmits based on the image type of the distribution image and the image type on which the video analysis is conducted, but is not limited thereto.

For example, the control unit 301 may be configured to acquire information indicating whether or not the imaging apparatus 100 is set to perform the processing for detecting the object by the detection unit 302 with respect to the image to transmit. In this case, if the imaging apparatus 100 is set to perform the processing for detecting the object by the detection unit 302, the control unit 301 determines that the detection function of the detection unit 302 is valid with respect to the image to transmit. Then, if the imaging apparatus 100 is set not to perform the processing for detecting the object by the detection unit 302, the control unit 301 determines that the detection function of the detection unit 302 is invalid with respect to the image to transmit.

In step S602, the storage unit 304 according to the present embodiment stores therein the image ID indicating the transmission order of the image that the communication unit 303 transmits and the information indicating whether the detection function is valid or invalid with respect to the image in association with each other, but is not limited thereto. For example, the storage unit 304 may be configured to store therein the information about the detection function with respect to the image that the communication unit 303 has transmitted last time and the information about the detection function with respect to the image that the communication unit 303 transmits at this time.

Next, the information indicating that the object is not detected will be described based on the metadata in compliance with the ONVIF standard by way of example with reference to FIG. 7. FIG. 7 illustrates an example of a description of the metadata in compliance with the ONVIF standard.

ONVIF defines the metadata in Extensible Markup Language (XML), and data therein is hierarchically structured. Metadata 700 is one example of the metadata to which the object information is added in step S605. In the metadata 700, a <MetadataStream> tag indicates the entire metadata, and includes the object information about the object, which is a result of the video analysis, a pan/tilt/zoom (PTZ) position of the imaging apparatus 100, an event, and the like. A <Frame> tag in <VideoAnalytics> indicates the result of the video analysis. Further, an <Object> tag in the <Frame> tag indicates the object information about the object detected by the detection unit 302 in the image.

Further, a <BoundingBox> tag in the <Object> tag indicates the bounding rectangle representing the position of the object, and is expressed with use of two points, a left and top point, and a right and bottom point on x and y coordinates in the distribution image.

Metadata 701 is one example of the metadata to which the information indicating that the detection unit 302 does not detect the object is added in step S607. In this case, the metadata 701 includes the <Frame> tag, which indicates the result of the video analysis, but lacks the <Object> tag in the <Frame> tag, and this indicates that any object is not detected.

If the determination in step S604 or step S606 is NO, the metadata that does not contain the <VideoAnalytics> tag is generated and transmitted to the client apparatus 101. In a case where the client apparatus 101 receives the metadata but there is the object information received in the past, the client apparatus 101 continues holding the object information.

Figure 7:
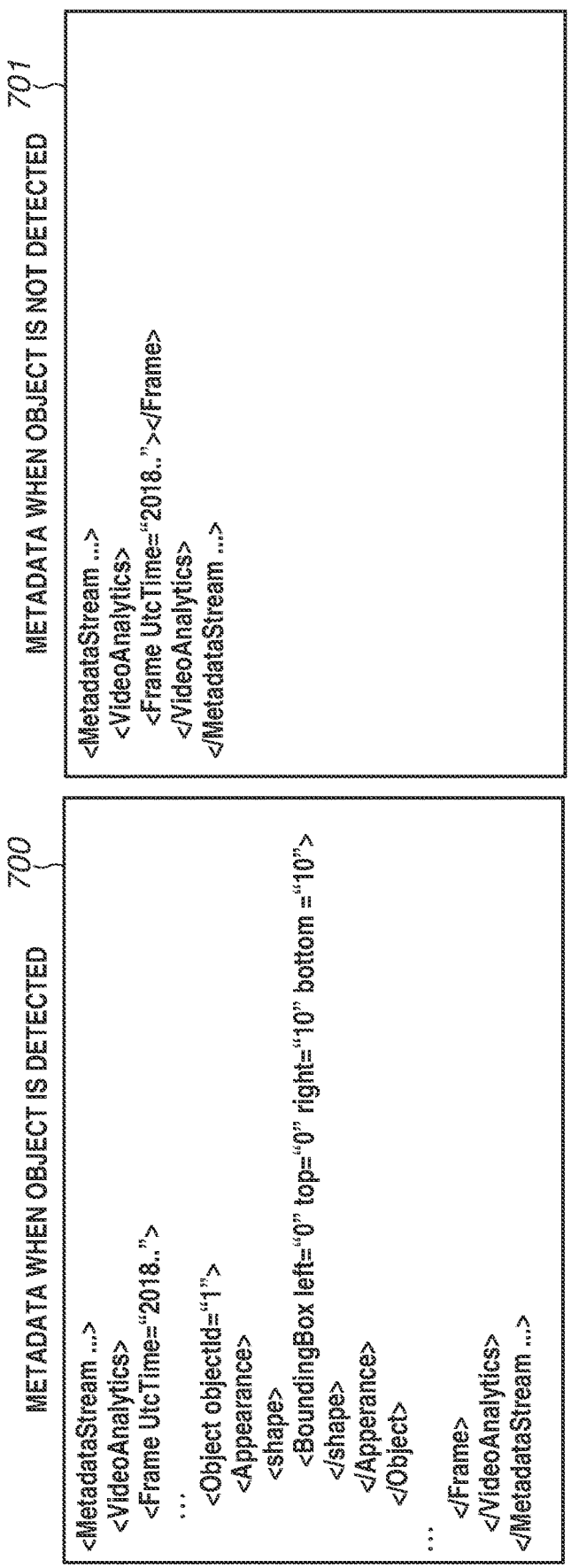
FIG. 7 illustrates an outline of an example of a description of metadata.

The metadata illustrated in FIG. 7 is one example according to the present embodiment, and is not intended to limit the format of it thereto. A format specific to ONVIF or the monitoring camera can be used therefor, and any format may be used as long as the employed format can express the metadata indicating that the object is detected and the metadata indicating that the object is not detected.

In the above-described manner, the control unit 301 according to the present embodiment determines whether the detection function of the detection unit 302 is valid with respect to a first image that the communication unit 303 transmits and the detection function becomes invalid with respect to a second image that the communication unit 303 transmits after the first image. Then, if the detection function becomes invalid with respect to the second image, the control unit 301 adds, to the metadata, the information indicating that the object is not detected with respect to the second image, and the metadata is transmitted to the client apparatus 101 via the communication unit 303. By this operation, the client apparatus 101 can be prevented from continuing holding the invalid object information.

In the following description, a second embodiment will be described. The control unit 301 of the imaging apparatus 100 according to the second embodiment controls the communication unit 303 to cause it to transmit occurrence of a change in the detection function from the validity to the invalidity to the client apparatus 101 as an event notification. In the following description, processing performed by the imaging apparatus 100 and the client apparatus 101 according to the second embodiment will be described with reference to FIGS. 8 and 9. The same or similar functional configuration and processing as or to the first embodiment will be identified by the same reference numeral, and a redundant description thereof will be omitted as appropriate.

The communication unit 303 according to the present embodiment performs the following processing. That is, if the detection function of the detection unit 302 is valid with respect to the first image that the communication unit 303 transmits and the detection function is invalid with respect to the second image that the communication unit 303 transmits after the first image, the communication unit 303 transmits the invalidity information indicating that the object is not detected with respect to the second image. At this time, the invalidity information according to the present embodiment is the event notification indicating that the detection function is changed from the validity to the invalidity.

A sequence in which the client apparatus 101 receives the image and the metadata from the imaging apparatus 100 will be described with reference to FIG. 8. FIG. 8 illustrates the sequence in which the client apparatus 101 receives the image and the metadata from the imaging apparatus 100.

The control unit 330 of the client apparatus 101 controls the communication unit 331 to transmit the command that contains the information for specifying the image type of the distribution image and the instruction requesting the image distribution and the metadata distribution so as to receive the image distribution and the metadata distribution from the imaging apparatus 100.

The communication unit 303 of the imaging apparatus 100 receives the command requesting the image distribution and the metadata distribution. Then, the control unit 301 generates the distribution image based on the image type specified by the client apparatus 101 and the metadata by processing for adding the object information to the metadata according to information addition processing 800.

The control unit 301 controls the communication unit 303 to transmit the generated distribution image and metadata to the client apparatus 101. Then, the communication unit 331 of the client apparatus 101 receives the transmitted distribution image and metadata.

Further, in the information addition processing 800, the control unit 301 of the imaging apparatus 100 determines that the detection function of the detection unit 302 is changed from the validity to the invalidity with respect to the image that the imaging apparatus 100 transmits, and issues the event notification indicating that the detection function is changed if the detection function is changed from the validity to the invalidity. At this time, the control unit 301 controls the communication unit 303 to issue the event notification to the client apparatus 101.

The communication unit 331 of the client apparatus 101 receives the transmitted event notification.

Upon receipt of the metadata containing the object information or the event notification, the control unit 330 of the client apparatus 101 performs information update processing 801.

A protocol of the command for use in the communication between the client apparatus 101 and the imaging apparatus 100 illustrated in FIG. 8 may be ONVIF or may be a control protocol specific to the monitoring camera that is prepared by each manufacturer.

Figure 9A:
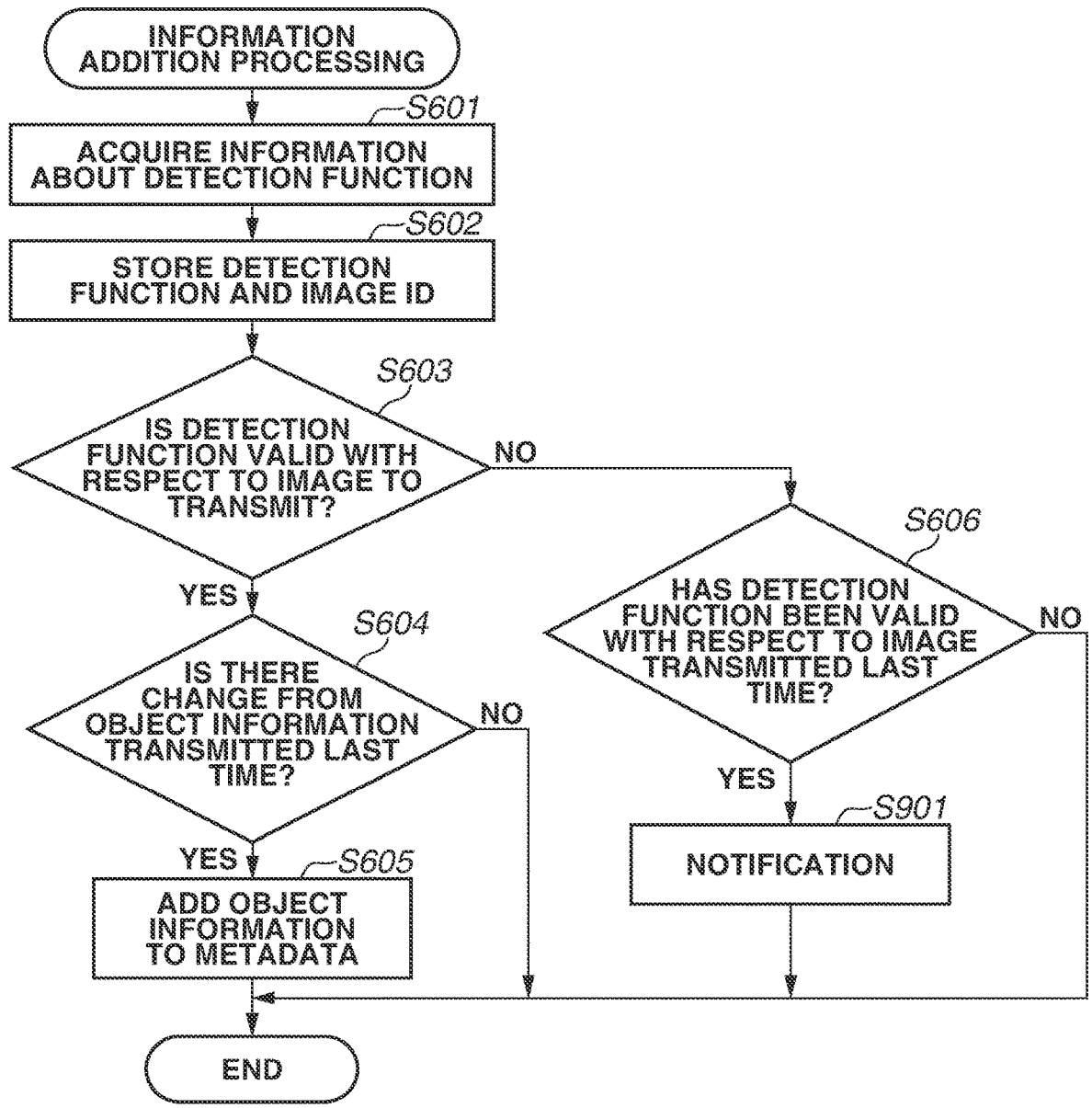

Next, the information addition processing 800 according to the present embodiment will be described with reference to FIGS. 9A and 9B. FIG. 9A is a flowchart illustrating a flow of the information addition processing 800 performed by the imaging apparatus 100 according to the present embodiment. FIG. 9B is a flowchart illustrating a flow of the information update processing 801 performed by the client apparatus 101 according to the present embodiment.

The processing according to the flowchart illustrated in FIG. 9A will be described assuming that it is performed by each of the functional blocks illustrated in FIG. 3A that are realized by the CPU 200 executing the computer program stored in the ROM 203 of the imaging apparatus 100.

Further, the processing according to the flowchart illustrated in FIG. 9B will be described assuming that it is performed by each of the functional blocks illustrated in FIG. 3B that are realized by the CPU 210 executing the computer program stored in the HDD 213 of the client apparatus 101.

First, the information addition processing 800 illustrated in FIG. 9A will be described.

Processing from step S601 to step S606 is similar to the first embodiment, and therefore a description thereof will be omitted here.

In step S901, the control unit 301 according to the present embodiment issues the event notification indicating that the detection function of the detection unit 302 is changed from the validity to the invalidity with respect to the image that the imaging apparatus 100 transmits.

Then, the communication unit 331 of the client apparatus 101 receives the event notification as described with reference to FIG. 8.

If the determination in step S604 or step S606 is NO or if the determination in step S606 is YES, the metadata lacking the <VideoAnalytics> tag therein is generated and transmitted to the client apparatus 101. In a case where the client apparatus 101 receives the metadata but there is the object information received in the past, the client apparatus 101 continues holding the object information.

Next, the information update processing 801 performed by the client apparatus 101 illustrated in FIG. 9B will be described. The information update processing 801 illustrated in FIG. 9B is performed when the client apparatus 101 receives the metadata containing the object information or the event notification from the imaging apparatus 100.

If the client apparatus 101 receives the event notification in step S902 (YES in step S902), the processing proceeds to step S611. If the client apparatus 101 does not receive the event notification in step S902 (NO in step S902), the processing proceeds to step S609.

Processing from step S609 to step S613 is similar to the first embodiment, and therefore a description thereof will be omitted here.

In the above-described manner, the client apparatus 101 according to the second embodiment receives the occurrence of the change in the detection function of the imaging apparatus 100 from the validity to the invalidity as the event notification, and updates the object information into the information indicating that the object is not detected. By this operation, the client apparatus 101 that receives the distribution image and the metadata can be prevented from holding the invalid object information.

In the following description, a third embodiment will be described. The client apparatus 101 according to the third embodiment inquires of the imaging apparatus 100 about the occurrence of the change in the detection function of the imaging apparatus 100 from the validity to the invalidity (polling). In the following description, information update processing 1002 in which the client apparatus 101 according to the third embodiment updates the object information will be described with reference to FIGS. 10 and 11. The same or similar functional configuration and processing as or to the first embodiment will be identified by the same reference numeral, and a redundant description thereof will be omitted as appropriate.

Figure 10:
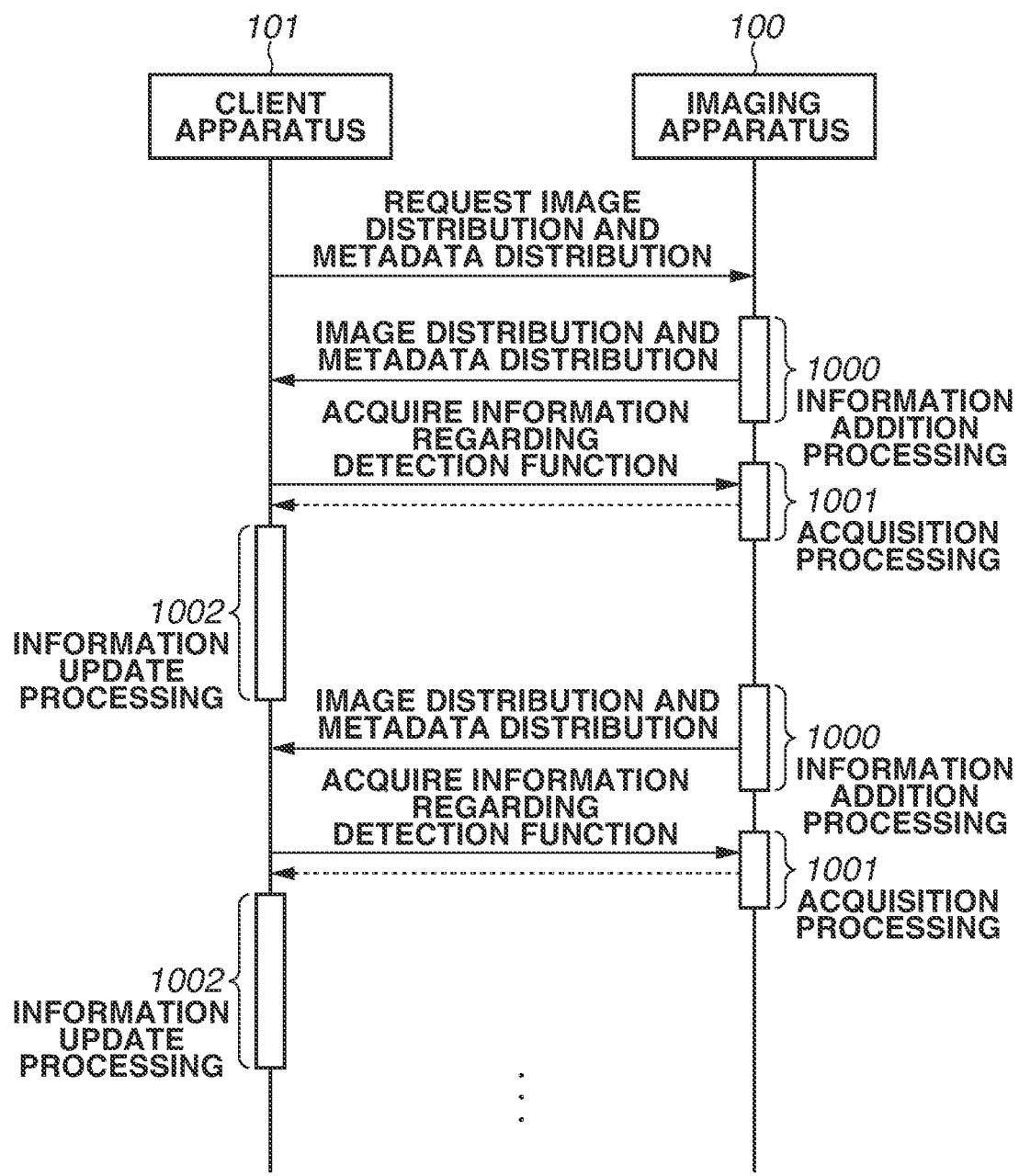
FIG. 10 illustrates a sequence of the image distribution and the metadata distribution between the imaging apparatus and the client apparatus.

A sequence in which the client apparatus 101 receives the image and the metadata from the imaging apparatus 100 will be described with reference to FIG. 10. FIG. 10 illustrates the sequence in which the client apparatus 101 receives the image and the metadata from the imaging apparatus 100.

The control unit 330 of the client apparatus 101 controls the communication unit 331 to transmit the command requesting the image distribution and the metadata distribution in which the type of the image is specified so as to receive the image distribution and the metadata distribution from the imaging apparatus 100.

The communication unit 303 of the imaging apparatus 100 receives the command requesting the image distribution and the metadata distribution that is transmitted from the client apparatus 101.

The control unit 301 of the imaging apparatus 100 generates the distribution image according to the image type specified by the client apparatus 101 and the metadata by processing for adding the object information to the metadata according to information addition processing 1000 based on the received command. The information addition processing 1000 according to the present embodiment adds the metadata to the object information if there is a change in the object information transmitted last time. On the other hand, the metadata lacking the <VideoAnalytics> tag therein is generated and transmitted to the client apparatus 101 if there is no change in the object information transmitted last time. Even when the client apparatus 101 receives this metadata, the client apparatus 101 continues holding this object information in a case where there is the object information received in the past. However, if there is no object information transmitted last time, i.e., the imaging apparatus 100 performs the information addition processing 1000 for the first time after receiving the request for the image distribution and the metadata distribution from the client apparatus 101, the object information is added to the metadata.

The control unit 301 of the imaging apparatus 100 controls the communication unit 303 to transmit the generated image and metadata to the client apparatus 101. Then, the communication unit 331 of the client apparatus 101 receives the transmitted image and metadata.

After the communication unit 331 receives the transmitted image and metadata, the control unit 330 controls the communication unit 331 to transmit a command requesting acquisition of the information indicating whether the detection function of the detection unit 302 is valid or invalid with respect to the received image. At this time, the control unit 330 according to the present embodiment controls the communication unit 331 to transmit a command requesting the image type on which the video analysis is conducted.

The communication unit 303 of the imaging apparatus 100 receives this command, and the control unit 301 acquires the information indicating whether the detection function is valid or invalid by acquisition processing 1001. At this time, the control unit 301 acquires the image type on which the image analysis is conducted by the acquisition processing 1001 according to the present embodiment. In this case, the control unit 301 may be configured to acquire, from the storage unit 304, the setting value of the image type on which the video analysis is conducted or may be configured to acquire the image type on which the video analysis is conducted based on the installation state of the imaging apparatus 100.

The control unit 301 may be configured to acquire the information indicating whether or not the imaging apparatus 100 is set to perform the processing for detecting the object by the detection unit 302 in the acquisition processing 1001. In this case, if the imaging apparatus 100 is set to perform the processing for detecting the object by the detection unit 302, the control unit 301 determines that the detection function of the detection unit 302 is valid with respect to the distribution image. Then, if the imaging apparatus 100 is set not to perform the processing for detecting the object by the detection unit 302, the control unit 301 determines that the detection function of the detection unit 302 is invalid with respect to the distribution image.

The control unit 301 sets the acquired information regarding the detection function into a response to the command and transmits it from the communication unit 303 to the client apparatus 101 as the response. At this time, in the present embodiment, the control unit 301 sets the acquired image type on which the image analysis is conducted into the response to the command.

The communication unit 331 of the client apparatus 101 receives this response and performs object information update processing 1002.

A protocol of the command for use in the communication between the client apparatus 101 and the imaging apparatus 100 illustrated in FIG. 10 may be ONVIF or may be a control protocol specific to the monitoring camera that is prepared by each manufacturer.

Figure 11:
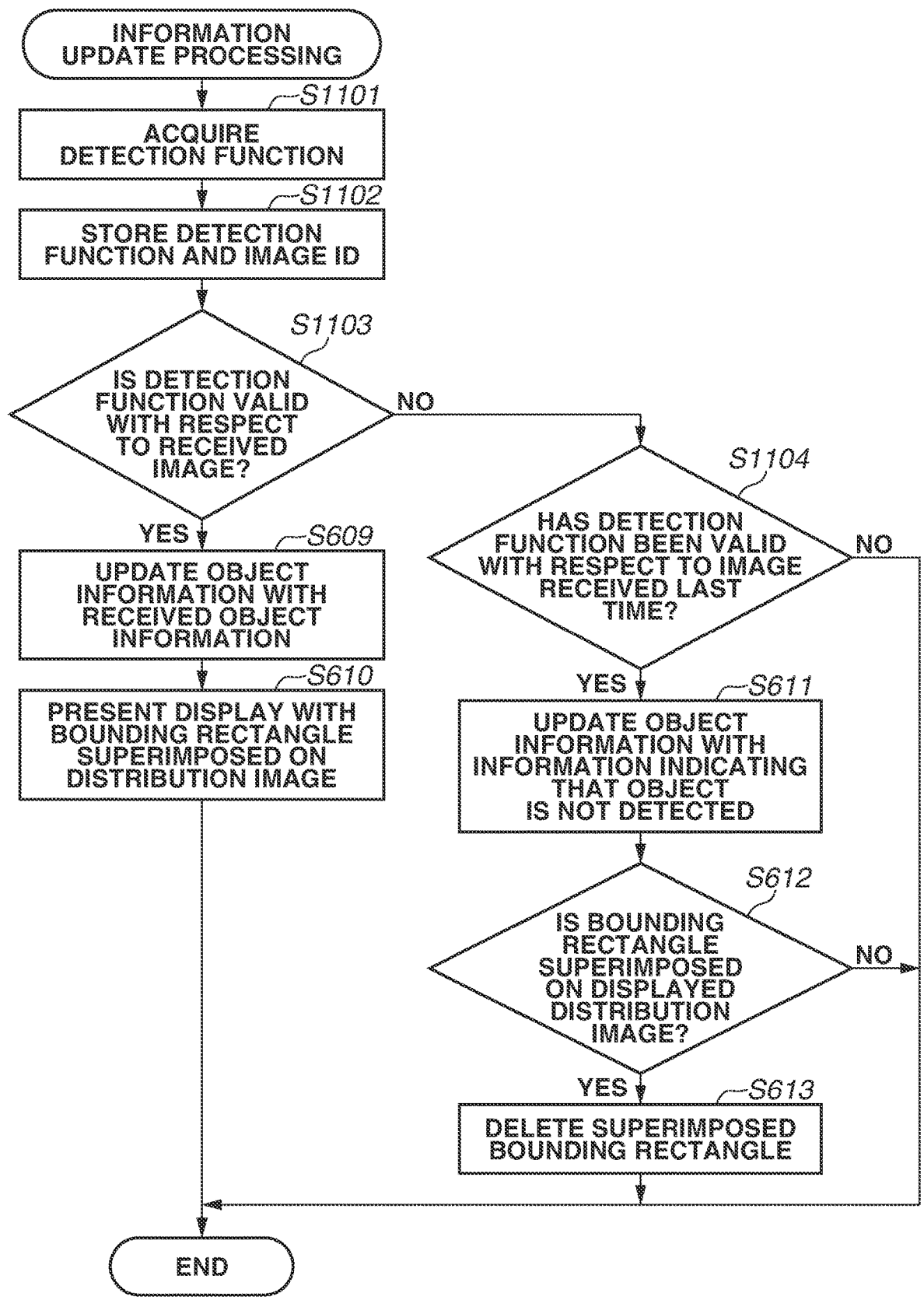
FIG. 11 is a flowchart of information update processing.

Next, the object information update processing 1002 performed by the client apparatus 101 according to the present embodiment will be described with reference to FIG. 11. FIG. 11 is a flowchart illustrating a flow of the object information update processing 1002 performed by the client apparatus 101.

The processing according to the flowchart illustrated in FIG. 11 will be described assuming that it is performed by each of the functional blocks illustrated in FIG. 3B that are realized by the CPU 210 executing the computer program stored in the HDD 213 of the client apparatus 101.

In step S1101, the control unit 330 acquires the information indicating whether the detection function of the detection unit 302 is valid or invalid with respect to the received image. The control unit 330 according to the present embodiment determines that the detection function is valid if the image type of the distribution image received by the communication unit 331 and the image type of the image on which the detection unit 302 performs the processing for detecting the object match each other, and determines that the detection function is invalid if these image types do not match each other.

In this case, in step S1101, the control unit 330 according to the present embodiment acquires the image type of the distribution image and the image type of the image on which the video analysis is conducted. The control unit 330 acquires the setting value of the image type of the distribution image from the command requesting the image distribution to the imaging apparatus 100 in which the type of the image is specified. Further, the control unit 330 acquires the image type of the image on which the video analysis is conducted from the response to the command requesting the acquisition of the information indicating whether the detection function of the detection unit 302 is valid or invalid with respect to the received image.

Then, the control unit 330 according to the present embodiment determines whether the detection function of the detection unit 302 is valid or not with respect to the image that the communication unit 303 transmits based on the acquired image type of the distribution image and image type on which the video analysis is conducted.

In step S1102, the storage unit 333 stores the image ID indicating a reception order of the image received by the communication unit 331, and the information indicating whether the detection function of the detection unit 302 is valid or invalid that is determined by the control unit 330 with respect to the image, in association with each other.

In step S1103, the control unit 330 determines whether the detection function of the detection unit 302 is valid or not with respect to the image received by the communication unit 331. If the detection function is valid (YES in step S1103), the processing proceeds to step S609. If the detection function is invalid (NO in step S1103), the processing proceeds to step S1104.

Step S609 and step S610 are similar to the first embodiment, and therefore descriptions thereof will be omitted here.

In step S1104, the control unit 330 determines whether the detection function of the detection unit 302 has been valid or invalid with respect to the image received last time, based on the image ID indicating the reception order of the received image and the information indicating whether the detection function is valid or invalid with respect to the image that are stored in the storage unit 333. At this time, if the detection function has been valid with respect to the image received by the communication unit 331 last time (YES in step S1104), the processing proceeds to step S611. If the detection function has been invalid (NO in step S1104), the processing ends. The processing proceeds to NO in step S1104 and ends if there is no image received last time, i.e., if the information addition processing 1000 is performed for the first time after the client apparatus 101 transmits the command requesting the image distribution and the metadata distribution to the imaging apparatus 100.

Processing from step S611 to step S613 is similar to the first embodiment, and therefore a description thereof will be omitted here.

In the above-described manner, the client apparatus 101 according to the third embodiment acquires the information indicating whether the detection function of the detection unit 302 conducting the video analysis is valid or not with respect to the received image from the imaging apparatus 100. Then, the client apparatus 101 determines whether the detection function of the detection unit 302 is valid with respect to the first image received by the communication unit 331 and the detection function becomes invalid with respect to the second image received after the first image. Then, if the detection function becomes invalid with respect to the second image, the control unit 330 updates the object information with the information indicating that the object is not detected. By this operation, the client apparatus 101 can be prevented from holding the invalid object information.

According to each of the above-described embodiments, the client apparatus 101 can be prevented from continuing holding the invalid object information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-104906, filed May 31, 2018, which is hereby incorporated by reference herein in its entirety.

What is claimed is:

1. An image processing apparatus comprising a computer executing instructions that, when executed by the computer, cause the computer to function as:

an image acquisition unit configured to acquire an image;

a detection unit configured to detect an object in the image acquired by the image acquisition unit;

a receiving unit configured to receive a control command requesting a distribution image and metadata, the control command specifying an image type of the distribution image;

a control unit configured to acquire the distribution image according to the requested image type; and a transmission unit configured to transmit the distribution image and the metadata containing object information regarding the object detected from the image by the detection unit to an information processing apparatus, wherein the control unit is configured to determine that a detection function of the detection unit is valid if the image type of the distribution image and an image type of the image on which the detection unit performs processing for detecting the object match each other, and determine that the detection function is invalid if the image type of the distribution image and the image type of the image on which the detection unit performs the processing do not match each other; and if it is determined that the detection function is valid with respect to a first distribution image that the transmission unit transmits and it is determined that the detection function is invalid with respect to a second distribution image that the transmission unit transmits after the first distribution image, the transmission unit is configured to transmit invalidity information indicating that the object is not detected to the information processing apparatus.

2. The image processing apparatus according to claim 1, wherein the control unit is configured to, if the type of the image on which the processing for detecting the object is performed by the detection unit is a fisheye image and the type of the second distribution image that the transmission unit transmits is not the fisheye image, determine that the detection function is invalid with respect to the second distribution image that the transmission unit transmits, and the transmission unit is configured to transmit the invalidity information indicating that the object is not detected with respect to the second distribution image to the information processing apparatus.

3. The image processing apparatus according to claim 1, wherein the control unit is configured to, if the type of the image on which the processing for detecting the object is performed by the detection unit is a panoramic image and the type of the second distribution image that the transmission unit transmits is not the panoramic image, determine that the detection function is invalid with respect to the second distribution image that the transmission unit transmits, and the transmission unit is configured to transmit the invalidity information indicating that the object is not detected with respect to the second distribution image to the information processing apparatus.

4. The image processing apparatus according to claim 1, wherein the invalidity information is metadata.

5. The imaging apparatus according to claim 4, wherein the invalidity information is metadata including a <Frame> tag having no <Object> tag therein.

6. The imaging apparatus according to claim 1, wherein the invalidity information is an event notification.

7. The image processing apparatus according to claim 1, further comprising an imaging device configured to capture the image.

8. An image processing method comprising:
acquiring an image;
detecting an object in the image; and
receiving a control command requesting a distribution image and metadata, the control command specifying an image type of the distribution image;
acquiring the distribution image according to the requested image type; and
transmitting the distribution image and the metadata containing object information regarding the object detected from the image to an information processing apparatus,
wherein, determining that a detection function of the detecting is valid if the image type of the distribution image and an image type of the image match each other, and determine that the detection function is invalid if the image type of the distribution image and the image type of the image do not match each other; and
if it is determined that the detection function is valid with respect to a first distribution image to transmit and it is determined that the detection function is invalid with respect to a second distribution image to transmit after the first distribution image, invalidity information indicating that the object is not detected is transmitted to the information processing apparatus.

9. A non-transitory recording medium readable by a computer, the recording medium storing a program for causing the computer to function as
an image acquisition unit configured to acquire an image,
a detection unit configured to detect an object in the image acquired by the image acquisition unit;
a receiving unit configured to receive a control command requesting a distribution image and metadata, the control command specifying an image type of the distribution image;
a control unit configured to acquire the distribution image according to the requested image type; and
a transmission unit configured to transmit the distribution image and the metadata containing object information regarding the object detected from the image by the detection unit to an information processing apparatus,
wherein the control unit is configured to, determine that a detection function of the detection unit is valid if the image type of the distribution image and an image type of the image on which the detection unit performs processing for detecting the object match each other, and determine that the detection function is invalid if the image type of the distribution image and the image type of the image on which the detection unit performs the processing do not match each other; and
if it is determined that the detection function is valid with respect to a first distribution image that the transmission unit transmits and it is determined that the detection function is invalid with respect to a second distribution image that the transmission unit transmits after the first distribution image, the transmission unit is configured to transmit invalidity information indicating that the object is not detected to the information processing apparatus.

* * * * *